(12) United States Patent
Caron et al.

(10) Patent No.: US 11,451,664 B2
(45) Date of Patent: Sep. 20, 2022

(54) OBJECTIVE TRAINING AND EVALUATION

(71) Applicant: CVS Pharmacy, Inc., Woonsocket, RI (US)

(72) Inventors: Roger A. Caron, Bristol, CT (US); Patrick J. Daniher, Mokena, IL (US); Christopher K. Hays, O'Fallon, MO (US); Joseph Livingston, St. Louis, MO (US); Cadesha M. Prawl, West Haven, CT (US)

(73) Assignee: CVS Pharmacy, Inc., Woonsocket, RI (US)

( * ) Notice: Subject to any disclaimer, the term of this patent is extended or adjusted under 35 U.S.C. 154(b) by 0 days.

(21) Appl. No.: 16/662,783

(22) Filed: Oct. 24, 2019

(65) Prior Publication Data

US 2021/0127004 A1   Apr. 29, 2021

(51) Int. Cl.
| | |
|---|---|
| *H04M 3/00* | (2006.01) |
| *H04M 5/00* | (2006.01) |
| *H04M 3/51* | (2006.01) |
| *G10L 15/08* | (2006.01) |
| *G10L 25/63* | (2013.01) |

(Continued)

(52) U.S. Cl.
CPC ........ *H04M 3/5175* (2013.01); *G06V 40/176* (2022.01); *G10L 15/083* (2013.01); *G10L 25/63* (2013.01); *G10L 2015/088* (2013.01); *H04M 2203/401* (2013.01); *H04M 2203/403* (2013.01)

(58) Field of Classification Search
CPC ......... H04M 3/5175; H04M 2203/403; H04M 2203/401; H04M 3/5183; H04M 3/5191; H04M 3/5233; H04M 2201/40; G06Q 10/06398; G06Q 10/0639; G06Q 10/063112; G06Q 30/016; G06Q 10/06393; G06F 40/00; G06F 16/245; G06F 16/24575; G06F 40/30; G06F 11/3409; G06F 11/3447; G06F 11/3457
USPC ............. 379/265.06, 265.09, 88.01, 265.12, 379/265.13; 705/7.42, 7.39, 7.41
See application file for complete search history.

(56) References Cited

U.S. PATENT DOCUMENTS

| | | |
|---|---|---|
| 8,094,790 B2 | 1/2012 | Conway et al. |
| 9,596,349 B1 | 3/2017 | Hernandez |
| 9,922,649 B1 * | 3/2018 | LoRe .................. G06Q 30/016 |

(Continued)

FOREIGN PATENT DOCUMENTS

| | | |
|---|---|---|
| WO | 03/065156 | 8/2003 |

*Primary Examiner* — Ahmad F. Matar
*Assistant Examiner* — Kharye Pope
(74) *Attorney, Agent, or Firm* — Patent Law Works LLP (57) ABSTRACT

A system and method configured to generate a simulated caller dialog including a caller intended issue for a scenario for testing a customer service representative (CSR). A simulated caller dialog is presented to the CSR and a CSR response to the simulated caller dialog is received and includes a CSR interpretation of the caller intended issue to the simulated caller dialog. An understanding determination result based on an intent determination recognition score is generated by an intent determination recognition model is generated in response to a comparison of the CSR interpretation of the caller intended issue matching the caller intended issue in the simulated caller dialog. A CSR score is generated for the scenario based on the understanding determination result. The CSR score is recorded to a database.

20 Claims, 6 Drawing Sheets

(51) Int. Cl.
*G06V 40/16* (2022.01)
*H04L 12/66* (2006.01)

(56) References Cited

U.S. PATENT DOCUMENTS

| | | | |
|---|---|---|---|
| 10,192,569 B1* | 1/2019 | Indyk | H04M 3/42042 |
| 10,490,191 B1* | 11/2019 | Benkreira | G10L 15/16 |
| 10,735,585 B1* | 8/2020 | Johnston | G06Q 10/10 |
| 2005/0131676 A1* | 6/2005 | Ghasemi | G10L 15/01 |
| | | | 704/201 |
| 2013/0129071 A1* | 5/2013 | Teitelman | H04M 3/51 |
| | | | 379/265.06 |
| 2013/0142332 A1 | 6/2013 | Ramos et al. | |
| 2014/0241519 A1* | 8/2014 | Watson | H04M 3/42221 |
| | | | 379/265.06 |
| 2015/0350438 A1* | 12/2015 | Arslan | G10L 25/63 |
| | | | 379/88.01 |
| 2016/0100059 A1 | 4/2016 | Skiba et al. | |
| 2016/0189558 A1* | 6/2016 | McGann | G09B 5/06 |
| | | | 434/219 |
| 2017/0339276 A1* | 11/2017 | Eftekhari | G06Q 30/016 |
| 2018/0110460 A1* | 4/2018 | Danson | A61B 5/02055 |
| 2018/0124242 A1* | 5/2018 | Zimmerman | G06F 40/35 |
| 2018/0233058 A1* | 8/2018 | Isozu | H04L 67/42 |
| 2019/0020605 A1* | 1/2019 | Efrati | G06F 40/30 |
| 2019/0050239 A1* | 2/2019 | Caldwell | G06Q 30/016 |
| 2019/0058793 A1* | 2/2019 | Konig | G06F 40/30 |
| 2019/0109802 A1 | 4/2019 | Akkiraju et al. | |
| 2019/0109803 A1* | 4/2019 | Akkiraju | H04M 3/51 |
| 2019/0251859 A1* | 8/2019 | Xu | G06Q 30/016 |
| 2020/0089767 A1* | 3/2020 | Ni | G06Q 30/016 |
| 2020/0092419 A1* | 3/2020 | Murali | G06N 3/08 |
| 2020/0111377 A1* | 4/2020 | Truong | H04M 3/5175 |
| 2020/0151583 A1* | 5/2020 | Mueller | G06N 5/02 |
| 2020/0160351 A1* | 5/2020 | Veggalam | H04M 3/5233 |
| 2020/0250581 A1* | 8/2020 | Razin | G06N 3/006 |
| 2020/0374398 A1* | 11/2020 | Sharma | H04M 3/5116 |

* cited by examiner

Scenario 01

| | Dialog | Suggestions | Points/Stress Level |
|---|---|---|---|
| 406 | CSR: Hello. "My name is Tom, how may I help you today?" | Try slowing down your speech and lower your volume. | Points=50 |
| 412 | Caller Simulation: I had a mastectomy last week and I need to know if the insurance will cover prostheses at 8 weeks and reconstructive surgery later. | Caller is obviously stressed and concerned. | Stress=OK |
| 418 | CSR: There is a Clinical Policy Bulletin that explains the medical criteria for this coverage. | Make sure you fully answer her question. Speak with more empathy. | Points=100 |
| 424 | Caller Simulation: What's that; where can I get that? | Callers stress level is rising. | Stress=Moderate and Increasing |
| 430 | CSR: I can send it to you in an email? | Are you sure you have fully answered her question and made her feel like you care? | Points=110 |
| 436 | Caller Simulation: Um, ok, thanks. | Customer sounds confused | Stress=High |
| 442 | CSR: OK thank you for calling your insurance company. | | Points=200 |
| 448 | Call End | | |

| | Call Assessment Results |
|---|---|
| 454 | |
| 460 | 1) Total: 200 pts out of a possible 500 pts. |
| 466 | 2) Member felt frustrated that her question was not fully answered. |
| 472 | 3) Member felt that she has to call back to get more info and ask her doctor for help figuring it out the issue. |
| 478 | 4) CSR spoke too fast and loud and with a lack of compassion for the customer. |
| 484 | 5) CSR did not ask enough questions. |
| 490 | 6) Answers were incomplete and too brief. |
| | 7) Suggestion: retake assessment. |

OBJECTIVE TRAINING AND EVALUATION

TECHNICAL FIELD

The present disclosure generally relates to simulated training of agents or customer service representatives (CSR), and more particularly to objectively presenting scenarios and measuring various aspects of CSR interaction in those scenarios.

BACKGROUND

Training of agents or customer service representatives (CSR) may be time-consuming and subjective. Different human trainers may impose personal styles, preferences, and biases during training resulting a varied training experience. Further, each human trainer may apply the same subjective characteristics for evaluating the various CSRs. Further, evaluation of other 'soft-skills' such as empathy and understanding, when evaluated by a human trainer, may also be evaluated based on subjective interpretations. Current human-based training and evaluation of CSRs has resulted in inconsistent training and inconsistent evaluation.

Further, human-based training and evaluation of CSRs may also be expensive and time consuming. Yet further, human-based training also requires the CSRs to be trained and evaluated when a human trainer is available. Accordingly, on-demand objective training and evaluation of CSRs would be beneficial in both cost and time.

SUMMARY

The present disclosure describes, among other things, various aspects for objectively training and evaluating CSRs. In general, one innovative aspect of the subject matter described in this disclosure may be embodied in a computer-implemented method, comprising generating a simulated caller dialog for a scenario for testing a customer service representative (CSR), the simulated caller dialog including a caller intended issue specific to the scenario; presenting at least a portion of the simulated caller dialog to the CSR, the portion including the caller intended issue; receiving a CSR response to the at least the portion of the simulated caller dialog, the CSR response including a CSR interpretation of the caller intended issue in the at least the portion of the simulated caller dialog; generating an understanding determination result based on an intent determination recognition score generated by an intent determination recognition model, the understanding determination result indicating whether the CSR in the CSR response correctly or incorrectly identified the caller intended issue; generating a CSR score for the scenario based on the understanding determination result; and recording the CSR score in a database.

Implementations may include one or more of the following features. The computer-implemented method further comprises generating accolade feedback to the CSR in response to the understanding determination result indicating the CSR correctly identified the caller intended issue. Also, the computer-implemented method further comprises restating the at least the portion of the simulated caller dialog in response to the understanding determination result indicating the CSR incorrectly identified the caller intended issue in the CSR response. Further, the computer-implemented method further comprises ceasing restating the at least the portion of the simulated caller dialog in response to the understanding determination result indicating the CSR incorrectly identified the caller intended issue for a failure count threshold quantity of occurrences.

Further implementations include the computer-implemented method further comprises comparing words in the CSR response to the caller intended issue with words in the caller intended issue in the at least the portion of the simulated caller dialog, and generating the intent determination recognition score in response to an outcome of the comparison. Yet further, the computer-implemented method further comprises generating a facial emotional recognition score using a facial emotional recognition model, the facial emotional recognition score in response to the facial emotional recognition model determining a level of emotional recognition in the CSR response to the at least the portion of the simulated caller dialog, and augmenting the CSR score based on the facial emotional recognition score.

Yet further implementations include the computer-implemented method further comprising generating a empathy keyword usage recognition score using an empathy keyword recognition model, the empathy keyword usage recognition score in response to the empathy keyword recognition model determining a level of empathy keyword usage in the CSR response to the at least the portion of the simulated caller dialog, and augmenting the CSR score based on the empathy keyword usage recognition score.

Yet further implementations include the computer-implemented method further comprising generating a customer service expected keyword usage recognition score using an expected customer service keyword recognition model, the customer service expected keyword usage recognition score in response to the expected customer service keyword recognition model determining a level of expected customer service keyword usage in the CSR response to the at least the portion of the simulated caller dialog, and augmenting the CSR score based on the customer service expected keyword usage recognition score. Generating the CSR score further comprises generating a leaderboard displaying the CSR score of the CSR with respect to previous scores of other CSRs. Further, the caller intended issue relates to one of a member, patient, or service provider.

Another general aspect includes a system including: one or more processors; and a memory storing instructions that, when executed, cause the one or more processors to: generate a simulated caller dialog for a scenario for testing a customer service representative (CSR), the simulated caller dialog including a caller intended issue specific to the scenario; present at least a portion of the simulated caller dialog to the CSR, the portion including the caller intended issue; receive a CSR response to the at least the portion of the simulated caller dialog, the CSR response including a CSR interpretation of the caller intended issue in the at least the portion of the simulated caller dialog; generate an understanding determination result based on an intent determination recognition score generated by an intent determination recognition model, the understanding determination result indicating whether the CSR in the CSR response correctly or incorrectly identified the caller intended issue; generate a CSR score for the scenario based on the understanding determination result; and record the CSR score in a database.

Implementations may include one or more of the following features. The system configured to generate accolade feedback to the CSR in response to the understanding determination result indicating the CSR correctly identified the caller intended issue. The system further configured to restate the at least the portion of the simulated caller dialog in response to the understanding determination result indicating the CSR incorrectly identified the caller intended issue in the CSR response.

Further implementations may include the system further configured to cease restating the at least the portion of the simulated caller dialog in response to the understanding determination result indicating the CSR incorrectly identified the caller intended issue for a failure count threshold quantity of occurrences. The system configured to cause to compare words in the CSR response to the caller intended issue with words in the caller intended issue in the at least the portion of the simulated caller dialog, and generate the intent determination recognition score in response to an outcome of the comparison. The system configured to generate a facial emotional recognition score using a facial emotional recognition model, the facial emotional recognition score in response to the facial emotional recognition model determining a level of emotional recognition in the CSR response to the at least the portion of the simulated caller dialog, and augment the CSR score based on the facial emotional recognition score.

Yet further implementations may include the system configured to generate an empathy keyword usage recognition score using an empathy keyword recognition model, the empathy keyword usage recognition score in response to the empathy keyword recognition model determining a level of empathy keyword usage in the CSR response to the at least the portion of the simulated caller dialog, and augment the CSR score based on the empathy keyword usage recognition score. The system configured to generate a customer service expected keyword usage recognition score using an expected customer service keyword recognition model, the customer service expected keyword usage recognition score in response to the expected customer service keyword recognition model determining a level of expected customer service keyword usage in the CSR response to the at least the portion of the simulated caller dialog, and augment the CSR score based on the customer service expected keyword usage recognition score. The system configured to generate a leaderboard displaying the CSR score of the CSR with respect to previous scores of other CSRs.

Another general aspect includes a system including a means for generating a simulated caller dialog for a scenario for testing a customer service representative (CSR), the simulated caller dialog including a caller intended issue specific to the scenario; a means for presenting at least a portion of the simulated caller dialog to the CSR, the portion including the caller intended issue; a means for receiving a CSR response to the at least the portion of the simulated caller dialog, the CSR response including a CSR interpretation of the caller intended issue in the at least the portion of the simulated caller dialog; a means for generating an understanding determination result based on an intent determination recognition score generated by an intent determination recognition model, the understanding determination result indicating whether the CSR in the CSR response correctly or incorrectly identified the caller intended issue; a means for generating a CSR score for the scenario based on the understanding determination result; and a means for recording the CSR score in a database.

It should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 4 illustrates an example scenario and scoring of a scenario according to the CSR training module method.

DETAILED DESCRIPTION

As set forth in detail below, the technology described herein provides an innovative approach and a practical application to present scenarios or guide conversations to a CSR trainee using a call simulator and apply a real-time analysis of the conversation to objectively measure parameters of the conversation to generate an objective score. Further, the technology described herein may provide coaching or suggestions to the CSR trainee to steer the conversation and measure improvement to obtain effective objectively measured results.

The various objectively measured parameters include intent determination, emotional state based on facial recognition, empathy and sentiment keyword recognition/usage based on keyword analysis, and expected interaction-keyword usage analysis. The objective measurements occur in response to presenting a CSR trainee with audio of a simulated caller using one or more scenarios, and then capturing the CSR trainee's words and facial expressions for analysis. Specifically, the CSR trainee may interact with a device, such as a headset, earpiece, computer screen, or smartphone, to listen to the words used in a simulated caller conversation. The CSR trainee's response is then analyzed and the CSR trainee may be provided with suggestions for improving engagement with the simulated caller.

The system and method solve a problem of a lack of human feeling and empathetic listening that is missing in everyday conversations and dialogue, but is important for emotional and sensitive interactions, such as customer service interactions with patients, caregivers, and supportive caregivers. Accordingly, the system and method incorporate human feelings, including empathy and listening skills, into an objective training and evaluation system and method that listens to the dialogue of a conversation, analyzes the words spoken, analyzes the user's facial expressions, provides best response suggestions to steer the conversation for positive outcomes, and objectively scores the CSR's performance.

Figure 1:
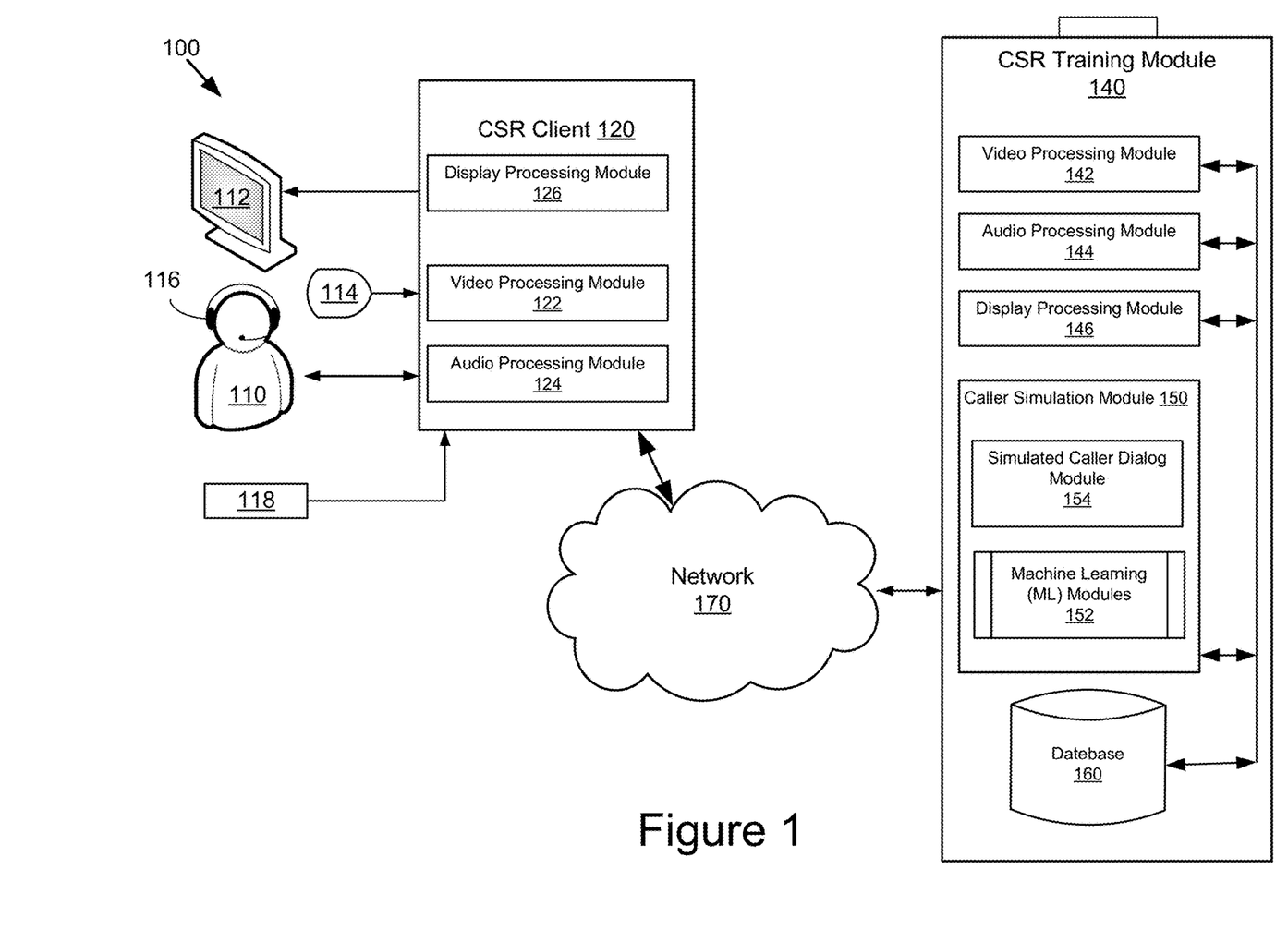
FIG. 1 illustrates a block diagram of a customer service system, in accordance with one or more embodiments.

FIG. 1 illustrates a block diagram of a customer service system, in accordance with one or more embodiments. System 100 may be configured to provide simulated training to customer service representatives. System 100 may include a CSR client 120 a CSR training module 140 and a network 170 configured to couple the CSR client 120 and the CSR training module 140. The CSR client 120 and the CSR training module 140 may be co-located or may be separated to accommodate remote CSR operations.

The CSR training system 100 may further include various components for accommodating a CSR 110. CSR 110 may interface or interact with the CSR client 120 using a headset 116 which may include a speaker and a microphone. Further, the CSR 110 may also interact with the CSR client 120 using a display monitor 112. Yet further, the CSR 110 may interact with CSR client 120 using a camera 114.

The CSR client 120 and the CSR training module 140 interact with complementary processes or modules for accommodating the exchange of audio and video information. For example, CSR client 120 may receive audio from a CSR 110 and process the audio with audio processing module 124. The audio may thereafter be exchanged with audio processing module 144 located in the CSR training module 140. Similarly, image information may also be displayed to the CSR 110 using a display monitor 112 with the information to be displayed being at display processing module 126, as received from display processing module 146 located in the CSR training module 140. Also, the camera 114 may capture images of CSR 110 using video processing module 122. The captured images or video may be forwarded to the video processing module 142 of the CSR training module 140.

As stated, the various systems and methods accommodate providing simulated scenarios to a CSR and then processing the CSR's response to obtain an objective measurement of the CSR's performance. Accordingly, CSR training module 140 further includes a caller simulation module 150. The caller simulation module 150 may include various machine learning models 152 configured with various models for analyzing a response generated by the CSR 110. The various models located in the machine learning models 152 may thereafter generate an objective score which may be stored within database 160.

Figure 2:
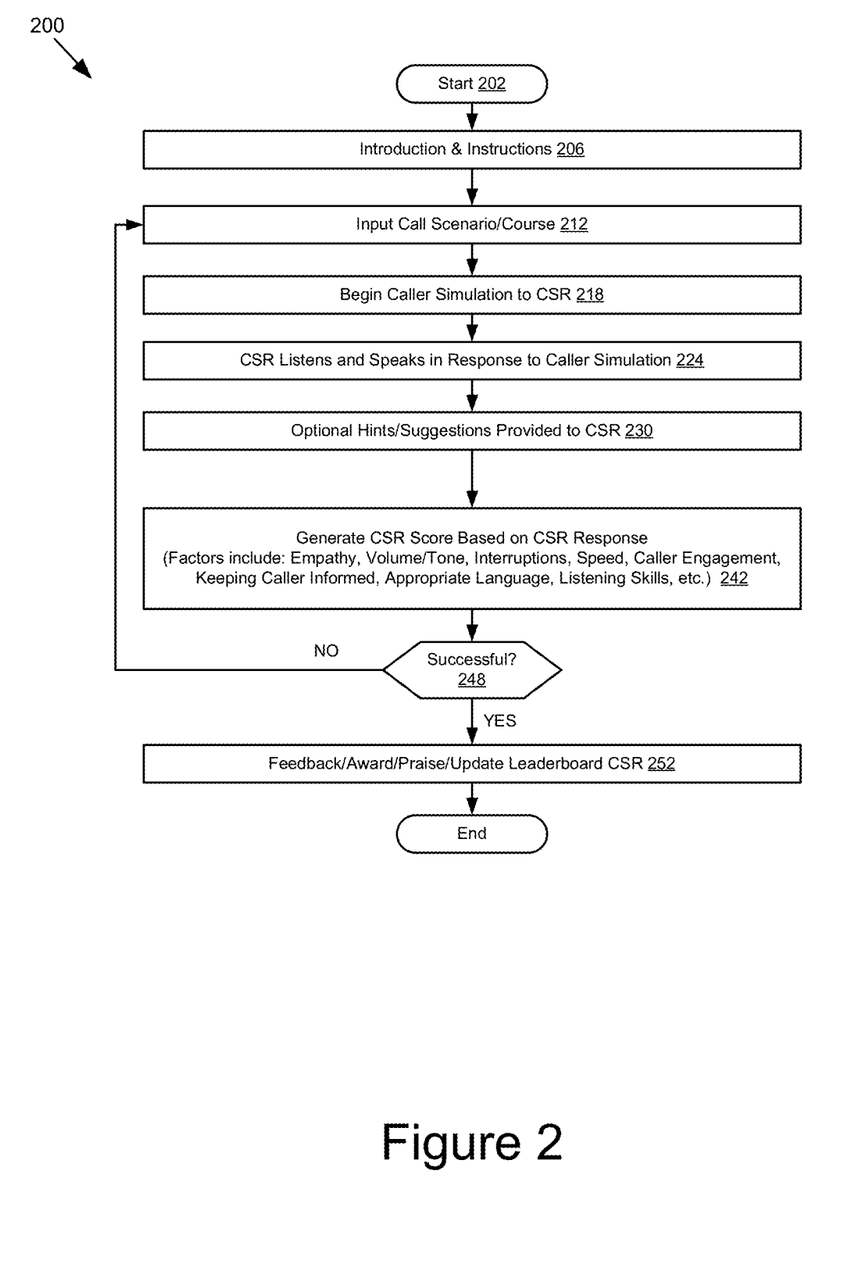
FIG. 2 illustrates a flow diagram of a method for a CSR training and evaluation system.

FIG. 2 illustrates a flow diagram of a method for a CSR training and evaluation system. The CSR training and evaluation system provides a process for objectively measuring a CSR's response based on a simulated caller scenario presented to the CSR. At block 202 the process for training and evaluating begins and may be configured to operate on a system including one or more processors, and a memory for storing instructions that, when executed, cause the one or more processors to perform the method described herein. In FIG. 2, the method 200 begins at block 206 where an introduction and instructions may be provided to a CSR 110. Introduction instructions may include standardized or baseline instructions which may provide a consistent experience for each of the CSRs which may be tested by the system 100.

In a block 212, a specific scenario or course may be selected by system 100 which may be specifically selected to test CSRs for specific potential roles. Each of the scenarios may include a specific intent or a specific issue to be tested.

Following the selection of the specific scenario or course, a block 218 begins the caller simulation to the CSR by generating, in a simulated caller dialog module 154, a simulated caller dialogue for a scenario for testing a CSR. The simulated caller dialogue may include a caller intended issue specific to the scenario. The caller intended issue may also be designated as an "expected intent" of the scenario.

In a block 218, at least a portion of the simulated caller dialogue is presented to the CSR. The portion of the simulated caller dialogue includes at least a caller intended issue. In one embodiment, the presentation of the portion of the simulated caller dialogue is presented to the CSR in audio format. In other embodiments, a portion of the simulated caller dialogue may be provided using visual elements such as by displaying portions of the simulated caller dialogue on a display monitor 112.

In a block 224, the CSR listens to the portion of the simulated caller dialogue including the caller intended issue and responds by generating (i.e., speaking) a CSR response for at least the portion of the simulated caller dialogue. The CSR response includes a CSR interpretation of the caller intended issue as received in at least the portion of the simulated caller dialogue. The CSR response is processed by the simulated caller dialog module 154 and is specifically analyzed by one or more of the machine learning models 152. Following the generation of a CSR response, the simulated caller dialog module 154 may generate hints or suggestions and provides hints or suggestions to the CSR 230. Such suggestions may include directions for the CSR to speak slower, speak more softly, or increase empathy when responding to the simulated caller dialogue.

A block 242 generates a score based on an understanding determination result based on an intent determination recognition score generated by an intent determination recognition model of the machine learning models 152. The understanding determination result indicating whether the CSR in the CSR response correctly or incorrectly identified the caller intended issue. The CSR score for the scenario may be generated based on the understanding determination result.

The query at block 248 is performed to determine a match of the CSR interpretation of the caller intended issue and the caller intended issue in at least a portion of the simulated caller dialogue. When the match comparison is not successful, then the simulated caller dialogue may be repeated or a different scenario may be selected. When the comparison of the CSR interpretation of the caller intended issue results in a match with the caller intended issue in at least the portion of the simulated caller dialogue, then in a block 252, feedback may be provided to CSR. Furthermore awards, praise or leadership positions in a leaderboard may also be updated or provided to provide accolades to the CSR for successful identification of the expected intent presented in the scenario. The resulting CSR score and any accolades, including presentation of a leaderboard, may be stored in a database 160.

Figure 3:
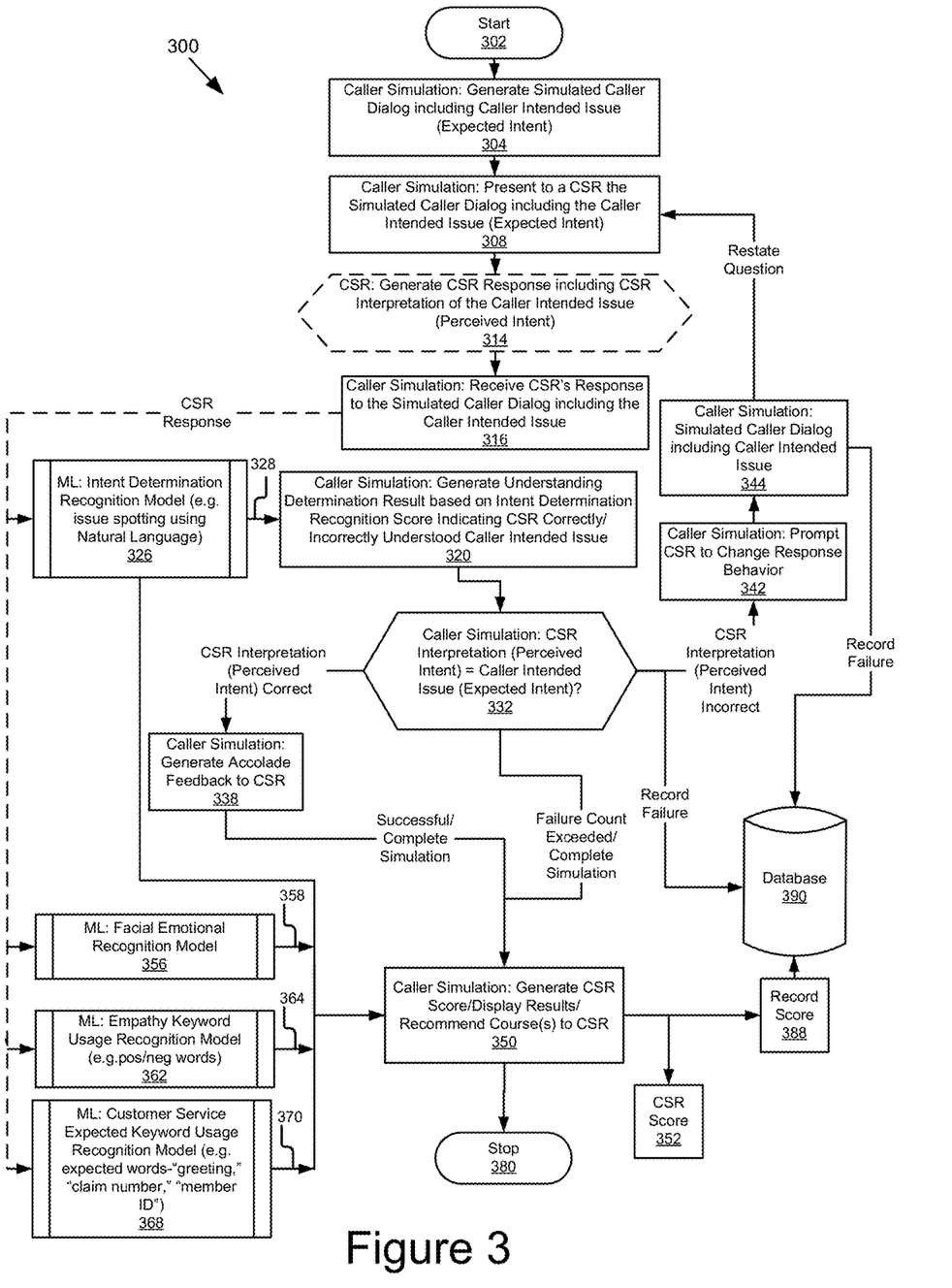
FIG. 3 is a flow diagram and illustrates a CSR training module method.

FIG. 3 is a flow diagram and illustrates a CSR training module 140 method. The example method 300 provides for objective training and evaluation of customer service representatives. At block 302 the process for training and evaluating begins and may be configured to operate on a system including one or more processors, and a memory for storing instructions that, when executed, cause the one or more processors to perform the method described herein.

One of the purposes of the method and system described herein is to provide an objective process for presenting a customer service representative (CSR) with an issue and then measuring the behaviors and performances of the CSR. The behaviors and performances may be measured in response to a varied simulated caller that may be configured to express different issues, different levels of frustration, anger, gratitude, etc., and then measure the CSR's ability to identify the intent or subject matter of the issue, express empathy toward the simulated caller and toward them and their issue, and engage the simulated caller using the correct keywords to address the issue.

Further, the CSR may become better trained through the use of real-time simulations by quickly identifying their problem areas and tailoring the training based upon the CSR's responses. The various aspects may utilize machine learning and artificial intelligence to assist a CSR to better respond to call center problems and exhibit empathy in given situations. Like actual callers, the 'simulated caller' may include multiple types of issues with multiple intents. Accordingly, the methods may be repeated to address many different issues and allow a CSR to be trained broadly or narrowly depending on the CSR's role.

At a block 304, the caller simulation generates a simulated caller dialog for a scenario for testing a customer service representative (CSR). The simulated caller dialog includes a caller intended issue specific to the scenario. The caller intended issue may be different for different scenarios and for different industries or applications. By way of example, a caller intended issue may be a specific customer problem, such as an issue related to billing, an issue related to insurance benefits, etc. The caller simulation operates in a manner that simulates a caller expressing an issue to a CSR. The issue may be based on an intended issue understanding (e.g., expected intent) used for objectively scoring the CSR.

At block 308, the caller simulation presents at least a portion of the simulated caller dialog to the CSR. The portion including the caller intended issue. The issue may be presented as a question or in the form of a narrative that expresses a condition or state of, for example, a patient member or a service provider. The issue may be presented to the CSR using audio (e.g., telephone call), or video (e.g., video call), or other means (e.g., text) common to call centers and contact centers.

The presentation of the simulated caller dialog may include variations in tone of voice including tones of anger, fear, frustration, aggression, etc. Further, the presentation of the simulated caller dialog may include variations in tempo in the simulated voice. The tempo variations may be a fast tempo indicating a rushed or frustrated customer, or may be a slow tempo indicating a confused or dejected customer. Also, a tempo may be in-between indicating a more composed simulated customer.

At block 314, a CSR (illustrated in dashes as being a block performed by a human) evaluates the simulated caller dialog including the caller intended issue, and responds with a CSR response to at least a portion of the simulated caller dialog. The CSR response includes a CSR interpretation of the caller intended issue in at least the portion of the simulated caller dialog. The CSR response includes a CSR's perceived issue understanding of the subject matter of the caller intended issue in the simulated caller dialog. The CSR response may include various characteristics including keywords, such as empathy keywords as well as subject matter keywords.

At block 316, the caller simulation receives the CSR response to at least the portion of the simulated caller dialog. As stated, the CSR response includes a CSR interpretation of the caller intended issue in at least the portion of the simulated caller dialog.

At block 320, the caller simulation module generates an understanding determination result based on an intent determination recognition score generated by an intent determination recognition model 326. The understanding determination result indicating whether the CSR in the CSR response correctly or incorrectly identified the caller intended issue.

Using the intent determination recognition model 326, the caller simulation module determines the CSR interpretation of the caller intended issue (e.g., perceived intent). The CSR response may be converted from voice-to-text for content evaluation including keyword analysis and determination. The CSR interpretation of the caller intended issue may be determined using keywords, such as subject matter keywords, that establish the basis for the issue. For example, the CSR response may be analyzed for keywords corresponding to known issues or problems. For example, a caller may complain of an issue with their account. The CSR may need to respond by asking for their claim number or member ID in response to determining the caller's intended issue. Subject matter keywords used by the CSR in the CSR response are compared against known subject matter keywords characteristic of the issue presented to the CSR. More specifically, the understanding determination result may be generated by comparing words in the CSR interpretation of the caller intended issue with words in the caller intended issue in at least a portion of the simulated caller dialog. The understanding determination result is then generated.

At block 332, the CSR interpretation of the caller intended issue is compared for a match with the caller intended issue in at least the portion of the simulated caller dialog.

In response to a match between the understanding determination result between the CSR interpretation of the caller intended issue and the caller intended issue in at least a portion of the simulated caller dialog, a block 338 generates accolade feedback to the CSR. The accolade feedback may include praise or congratulations in the form of audio or video playback, or may include placement on a leaderboard, or other congratulatory means including prizes and compensation.

At block 350, the caller simulation module 150 generates a CSR score 352 for the scenario based on the understanding determination result between the CSR interpretation of the caller intended issue and the caller intended issue in at least a portion of the simulated caller dialog. Further, the CSR score may be individually displayed, integrated into an accessible or stored leaderboard including scores of other previously or concurrently evaluated CSRs.

At block 388, the CSR score may be recorded in a database 360. At block 332, in response to the CSR interpretation of the caller intended issue not matching with the caller intended issue in at least the portion of the simulated caller dialog, then the caller simulation module 150 at block 342 may prompt the CSR to change behavior prior to a subsequent attempt. Specifically, the method may instruct the CSR to "speak more slowly," "speak more quickly," "speak with more empathy," "request specific information," etc.

At block 344, the caller simulation module 150 may restate at least a portion of the simulated caller dialog in response to the comparison of the understanding determination result based on the CSR interpretation of the caller intended issue failing to match the caller intended issue in at least the portion of the simulated caller dialog. Specifically, the method may restate the issue to the CSR when the comparison of the understanding determination result based on the CSR interpretation of the caller intended issue does not match the caller intended issue in at least the portion of the simulated caller dialog.

The simulated caller module 150 then, at block 314, presents at least a portion of a restated simulated caller dialog to the CSR. The restated simulated caller dialog may include changes to the tone (e.g., from indifferent to frustrated, etc.), tempo (e.g., from calm to angry, etc.), and may utilize a different portion of the simulated caller dialog.

The blocks 314, 316, and 320 are then repeated with the restated simulated caller dialog. Namely at block 314, the CSR (illustrated in dashes as being a block performed by a human) evaluates the restated simulated caller dialog including the caller intended issue, and responds with a CSR response to at least a portion of the simulated caller dialog. The CSR response includes a CSR interpretation of the caller intended issue in at least the portion of the simulated caller dialog. The CSR response includes a CSR's perceived issue understanding of the subject matter of the caller intended issue in the simulated caller dialog. The CSR response may include various characteristics including keywords, such as empathy keywords as well as subject matter keywords.

At block 316, the caller simulation receives the CSR response to at least the portion of the simulated caller dialog. As stated, the CSR response includes a CSR interpretation of the caller intended issue in at least the portion of the simulated caller dialog.

At block 320, the caller simulation module generates an understanding determination result based on the intent determination recognition score 328 generated by the intent determination recognition model 326. The understanding determination result indicating whether the CSR in the CSR response correctly or incorrectly identified the caller intended issue.

The loop then may continue to repeat with blocks 308, 314, 316, and 320 continuing to restate the simulated caller dialog, as described above. The process may be repeated when the understanding determination result does not obtain a favorable match or a failure count is exceeded or the simulation is completed or timed out. When a failure count is exceeded by a failure count threshold quantity of occurrences, then the caller simulation module ceases restating the portion of the simulated caller dialog.

As stated above at block 332, the CSR interpretation of the caller intended issue in at least the portion of the simulated caller dialog is compared with the caller intended issue in at least the portion of the simulated caller dialog, and processing continues to one of three paths, (i) the path including block 338, wherein accolade feedback is provide to the CSR when the comparison of the CSR interpretation of the caller intended issue does match the caller intended issue of the simulated caller dialog, (ii) the second path including block 344, wherein the caller intended issue is restated to the CSR when the comparison of the CSR interpretation of the caller intended issue does not match the caller intended issue of the simulated caller dialog, and (iii) the third path including block 350, wherein a CSR score is determined for the CSR response based at least in part on the comparison of the CSR interpretation of the caller intended issue with the caller intended issue of the simulated caller dialog.

The block 350, the caller simulation module 150 generates a CSR score 352 for the scenario based on the understanding determination result between the CSR interpretation of the caller intended issue and the caller intended issue in at least a portion of the simulated caller dialog when the call is otherwise terminated. As stated, the CSR score may be individually displayed, integrated into an accessible or stored leaderboard including scores of other previously or concurrently evaluated CSRs.

At block 350, the method determines a CSR score for the CSR response based at least in part on the comparison of the CSR interpretation of the caller intended issue with the caller intended issue of the simulated caller dialog. The CSR score from block 350 and other failures from blocks 332 and 344 may be stored (e.g., recorded) in a database 360.

The CSR score may be further determined based on additional processing. The determination of the CSR score may utilize one or more machine learning processes or models 326, 356, 362, and 368. The machine learning process 326 determines intent, and was briefly described above with respect to block 320 where the CSR's perceived issue understanding (intent) was determined. The machine learning process 326 may be configured to use machine learning techniques such as supervised learning.

As stated, block 350 may calculate a CSR score based at least in part on the intent determination recognition score 328 from the intent determination recognition model 326. The intent determination recognition score 328 provides a basis for the CSR score 352 by indicating the correct or incorrect understanding by the CSR.

As stated, the block 350 may also determine a CSR score based on additional factors. One such factor may be determined by other machine learning models, such as facial emotional recognition model 356 which generates a facial emotional recognition score 358 using a machine learning facial emotional recognition model. The facial emotional recognition score 358 in response to the facial emotional recognition model 356 determines a level of emotional recognition in the CSR response to at least the portion of the simulated caller dialog. The facial emotional recognition model 356 performs facial emotional recognition. The facial emotional recognition model 356 may be configured to take images of the CSR using camera 114, and perform analysis on the emotional state of the CSR. For example, the CSR's facial expressions may be captured by the camera 114. Then, specialized algorithms analyze the CSR's body language and facial expressions to determine a percentage of positivity displayed by the CSR. The facial emotional recognition score 358 is then added using block 350 to create the CSR score 352.

The CSR's facial expressions are captured by a camera associated with the CSR training module method 300. In one example, machine learning algorithms may analyze the CSR's body language and facial expressions to determine a measurement, level, or percentage of positivity the CSR conveys, with the measurement being used to correlate to a facial emotional recognition score 358 used to form or augment the CSR score 352.

The block 350 may further calculate the CSR score 352 based on additional factors. Another such factor may be determined by other machine learning models, such as empathy keyword usage recognition model 362 which generates an empathy keyword usage recognition score 364 using an empathy keyword usage recognition model 362. The empathy keyword usage recognition score 364 is in response to the empathy keyword usage recognition model 362 determining a level of empathy keyword usage in the CSR response in response to the portion of the simulated caller dialog. The level of empathy or sentiment of the CSR is determined using, for example, keyword recognition in the CSR response in block 316. The empathy or sentiment provides an insight into the overall positivity of the conversation between the CSR and the simulated caller. The sentiment can either be positive, negative, or neutral. For example, if the simulated caller dialog requires the CSR to display empathy, the CSR response may be analyzed to determine the sentiment. A measurement of the overall sentiment would desirably reflect a positive sentiment and may be based on the words the CSR uses in the conversation, with the measurement being used to correlate to an empathy keyword usage recognition score 364 used to form or augment the CSR score 352.

The block 350 may yet further calculate the CSR score 352 based on additional factors. Yet another such factor may be determined by other machine learning models, such as customer service expected keyword usage recognition model 368. The customer service expected keyword usage model 368 generates a customer service expected keyword usage recognition score 370 using a customer service expected keyword usage recognition model 368. The customer service expected keyword usage recognition score 370 is generated in response to the customer service expected keyword usage recognition model 368 determining a level of expected customer service keyword usage in the CSR response to at least a portion of the simulated caller dialog. The text analytics based off of keywords and sentences used by the CSR in the CSR response 316 may be processed using voice-to-text functionality. The various words used by the CSR in the CSR response 314 may be evaluated such as for the use of acronyms that an actual caller may not understand. Further, there is also an expectation that the CSR response would include keywords, such as "greetings," "claim numbers," "member IDs," etc. In one example, the quantity of the various keywords used by the CSR in the CSR response could be used to correlate to a customer service expected keyword usage recognition score 370, with the customer service expected keyword usage recognition score 370 being used to correlate to a measurement used to form or augment the CSR score 352.

Further, the CSR score 352 may be derived by assigning proportions or weights to each of the CSR score inputs, such as the intent determination recognition score 328, the facial emotional recognition score 358, the empathy keyword usage recognition score 364, and the customer service expected keyword usage recognition score 370. By way of example, the various scores may be differently weighted based on the specific simulations with some caller simulations for certain topics including more weight or analysis than others.

Yet further, other aspects may include fewer than all of the various scores identified. For example, the caller simulation may include text-based interaction with the CSR, such as a simulation of social media testing. In such embodiments, the CSR may receive the caller simulation via text displayed on the display monitor 112 with the CSR responding via a keyboard 118. In such a configuration, the facial emotional recognition model 356 may play a limited role as the CSR responses will be text-based via the keyboard 118.

FIG. 4 illustrates an example scenario and scoring of a scenario according to the CSR training module method described above. In FIG. 4, scenario 400 is illustrated and is not to be considered as limiting. Block 406, illustrates the CSR response to, for example, the CSR introducing themselves. The caller simulation module 150 then provides a suggestion to the CSR to, for example, reduce the tempo of their speech and lower the volume of their speech. Thereafter an interim scoring of the CSR is performed.

A block 412 illustrates the caller simulation stating a simulated caller dialog of the scenario for testing the CSR. The simulated caller dialog module 154 generates a simulated caller dialog for scenario for testing the CSR. The simulated caller dialog includes a caller intended issue specific for the scenario. The caller simulation module 150 presents at least a portion of the simulated caller dialog to the CSR where the portion includes the caller intended issue. The caller simulation module 150 may provide a suggestion that the simulated caller may be stressed and concerned.

In a block 418, the CSR generates a CSR response to the portion of the simulated caller dialog of the caller intended issue in the portion of the simulated caller dialog. The caller simulation module 150 generates an understanding determination result using the intent determination recognition model 326 in response to a comparison of the CSR interpretation of the caller intended issue matching the caller intended issue in the portion of the simulated caller dialog. The caller simulation module 150 generates a CSR score for this scenario based on the understanding determination result between the CSR interpretation of the caller intended issue and the caller intended issue in at least a portion of the simulated caller dialog.

In block 424, the caller simulation module 150 provides another portion of the simulated caller dialog for testing to the CSR. Suggestions and scoring may continue as described above.

In a block 430, the CSR generates a CSR response, which is processed as described above. Suggestions and scoring may also be continued as described above. In a block 436, the caller simulation module 150 provides another portion of the simulated caller dialog of the scenario for testing the CSR with suggestions and scoring as described above. In a block 442, the CSR generates a CSR response to the above portion of the simulated caller dialog with any suggestions and scoring continuing as described above. In block 448, the simulated caller dialog is terminated and a CSR score is generated.

All assessment results 452 may be presented to the CSR as illustrated in blocks 454-490. As illustrated in block 454, the CSR score is displayed with evaluations and suggestions for the CSR being provided in blocks 460-490.

Figure 5:
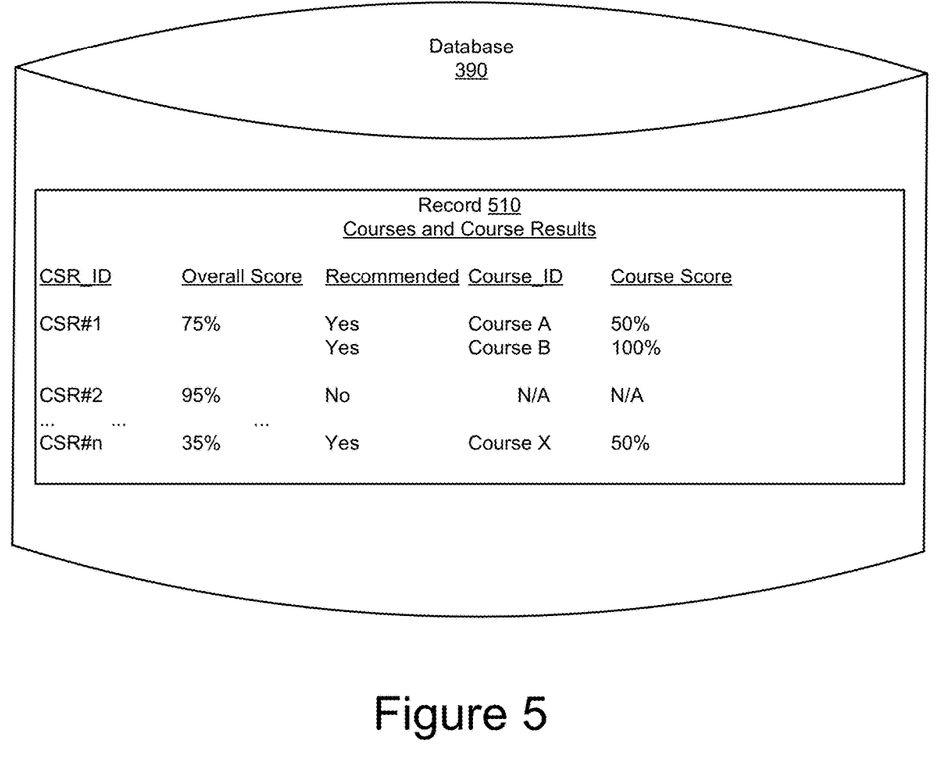
FIG. 5 illustrates an example table which may be stored in database.

FIG. 5 illustrates an example table which may be stored in database 360. Database 360 may include a record 510 including scores for one or more CSRs. By way of example, various scores and evaluation history may be maintained for each CSR. Each CSR may engage in various courses including one or more scenarios. Furthermore, record 510 may be configured as a leaderboard, the results of which may be presented to one or more CSRs in the form of test results or in the form of accolade feedback as described above with reference to block 338.

Figure 6:
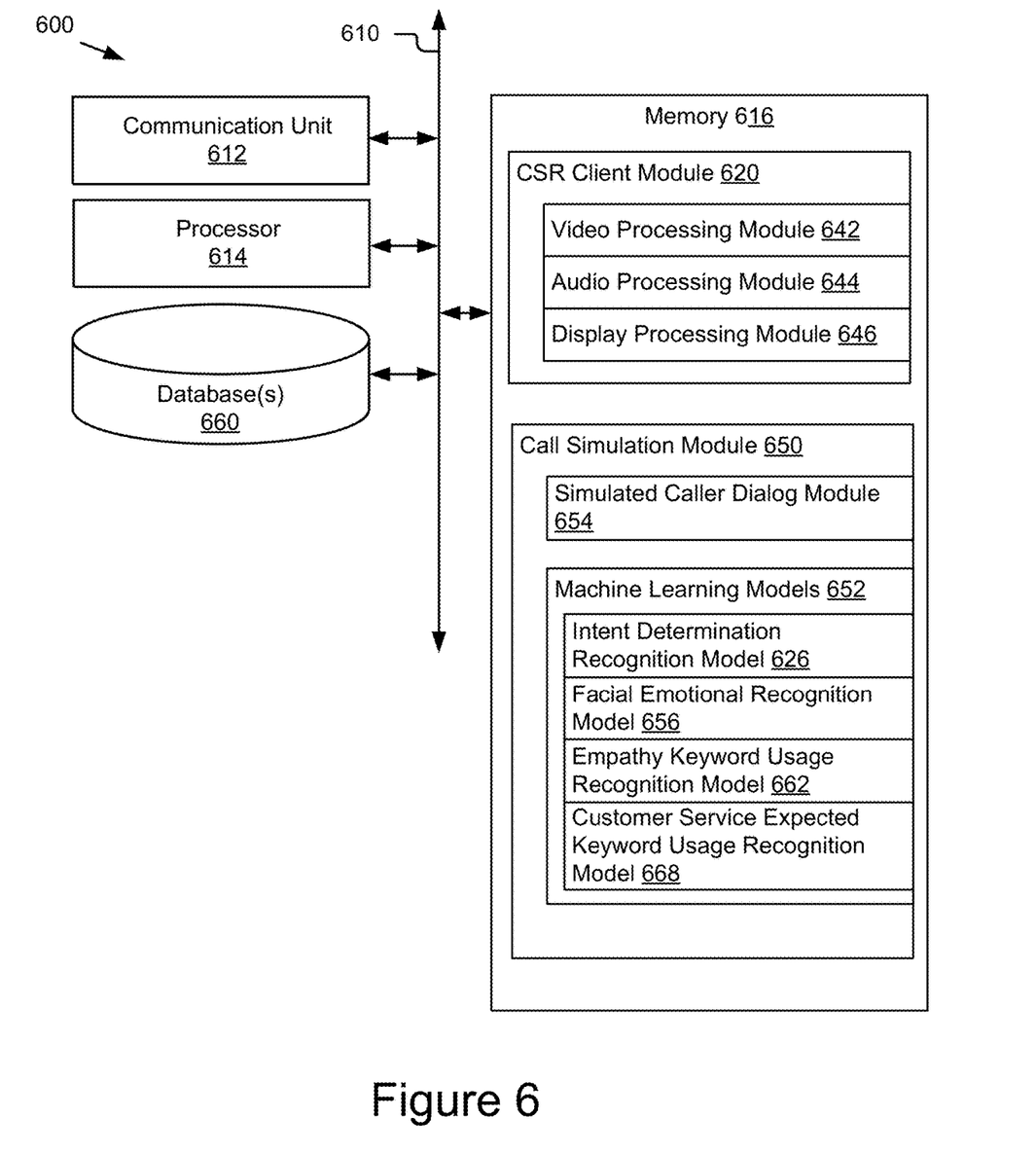
FIG. 6 schematically shows selected modules of a CSR training module.

FIG. 6 schematically shows selected modules of a CSR training module. CSR training module 600 may be configured with an architecture and/or hardware and may incorporate elements and configurations similar to those shown in FIGS. 1-5. For example, CSR training module 600 may include selected modules related to providing a practical application to present scenarios or guide conversations to a CSR trainee using a call simulator and apply a real-time analysis of the conversation to objectively measure parameters of the conversation to generate an objective score. Further, the technology described herein may provide coaching or suggestions to the CSR trainee to steer the conversation and measure improvement to obtain effective objectively measured results.

CSR training module 600 may include a bus 610 interconnecting at least one communication unit 612, at least one processor 614, and at least one memory 616. Bus 610 may include one or more conductors that permit communication among the components of CSR training module 600. Communication unit 612 may include any transceiver-like mechanism that enables CSR training module 600 to communicate with other devices and/or systems. For example, communication unit 612 may include wired or wireless mechanisms for communicating with the CSR client 120 via the network 170. Processor 614 may include any type of processor or microprocessor that interprets and executes instructions. Memory 616 may include a random access memory (RAM) or another type of dynamic storage device that stores information and instructions for execution by processor 614 and/or a read only memory (ROM) or another type of static storage device that stores static information and instructions for use by processor 614 and/or any suitable storage element such as a hard disk or a solid-state storage element.

CSR training module 600 may include or have access to one or more databases 660, which may correspond to databases 160 and 360 described herein. Databases 660 may include one or more data structures or records for storing CSR scores from one or more CSRs, and one or more leaderboards ranking a plurality of CSRs.

CSR training module 600 may include a plurality of modules or subsystems that are stored and/or instantiated in memory 616 for execution by processor 614. For example, memory 616 may include a CSR client module 620 configured to exchange audio and video with the CSR client 120 and provide processing of the audio and video between the CSR client and a caller simulation handler 650. The CSR client module 620 may include a video processing module 642 configured to obtain video images from the camera 114 for use by the facial emotional recognition model 356, as described above. The CSR client module 620 may further include an audio processing module 644 configured to exchange audio information with the CSR. The CSR client module 620 may further include a display processing module 646 configured to provide CSR scores, scenario selections and instructions, feedback, accolades, a leaderboard, and other visual information to be provided to a CSR.

CSR training module 600 further includes a caller simulation module 650 configured to present scenarios or guide conversations to a CSR trainee by simulating a caller and applying a real-time analysis of the conversation to objectively measure parameters of the conversation to generate an objective score. Further, the caller simulation module 650 may provide coaching or suggestions to the CSR trainee to steer the conversation and measure improvement to obtain effective objectively measured results. The caller simulation module 650 may include a simulated caller dialog module 654, and machine learning models 652. The simulated caller dialog module 654 includes executable instructions, which when executed by the processor 614 provide a means for generating a simulated caller dialog for a scenario for testing a customer service representative (CSR), where the simulated caller dialog includes a caller intended issue specific to the scenario.

The simulated caller dialog module 654 further includes executable instructions, which when executed by the processor 614 provide a means for presenting at least a portion of the simulated caller dialog to the CSR, the portion including the caller intended issue. The simulated caller dialog module 654 further includes executable instructions, which when executed by the processor 614 provide a means for receiving a CSR response to at least the portion of the simulated caller dialog, the CSR response including a CSR interpretation of the caller intended issue in at least the portion of the simulated caller dialog. The simulated caller dialog module 654 further includes executable instructions, which when executed by the processor 614, provide a means for generating an understanding determination result based on an intent determination recognition score generated by an intent determination recognition model, where the understanding determination result indicating whether the CSR in the CSR response correctly or incorrectly identified the caller intended issue. The simulated caller dialog module 654 further includes executable instructions, which when executed by the processor 614 provide a means for generating a CSR score for the scenario based on the understanding determination result. The simulated caller dialog module 654 further includes executable instructions, which when executed by the processor 614, provide a means for recording the CSR score in a database.

The simulated caller dialog module 654 further includes executable instructions, which when executed by the processor 614, generate accolade feedback to the CSR in response to the understanding determination result indicating the CSR correctly identified the caller intended issue. The simulated caller dialog module 654 further includes executable instructions, which when executed by the processor 614, restate at least the portion of the simulated caller dialog in response to the understanding determination result indicating the CSR incorrectly identified the caller intended issue in the CSR response. The simulated caller dialog module 654 further includes executable instructions, which when executed by the processor 614, cease restating at least the portion of the simulated caller dialog in response to the understanding determination result indicating the CSR incorrectly identified the caller intended issue for a failure count threshold quantity of occurrences.

As stated, the call simulation module 650 includes the machine learning model 652. The machine learning models 652 may include intent determination model 626, facial emotional recognition model 656, empathy keyword usage recognition model 662, and expected customer service keyword usage recognition model 668.

The intent determination recognition model 626 further includes executable instructions, which when executed by the processor 614, generates an intent determination recognition score 328 used to generate an understanding determination result, where the understanding determination result is in response to a comparison of the CSR interpretation of the caller intended issue matching the caller intended issue in at least the portion of the simulated caller dialog.

The facial emotional recognition model 356 further includes executable instructions, which when executed by the processor 614, generate a facial emotional recognition score 358, where the facial emotional recognition score is in response to the facial emotional recognition model determining a level of emotional recognition in the CSR response to at least a portion of the simulated caller dialog. The facial emotional recognition score 358 is thereafter used by the simulated caller dialog module 654 to augment the CSR score based on the facial emotional recognition score 358.

The empathy keyword usage recognition model 662 further includes executable instructions, which when executed by the processor 614, generate an empathy keyword usage recognition score 364, the empathy keyword usage recognition score is in response to the empathy keyword recognition model 662 determining a level of empathy keyword usage in the CSR response to at least a portion of the simulated caller dialog. The empathy keyword usage recognition score 364 is thereafter used by the simulated caller dialog module 654 to augment the CSR score based on the empathy keyword usage recognition score 364.

The expected customer service keyword usage recognition model 668 further includes executable instructions, which when executed by the processor 614, generate a customer service expected keyword usage recognition score 370, where the customer service expected keyword usage recognition score 370 is in response determining a level of expected customer service keyword usage in the CSR response to at least a portion of the simulated caller dialog. The customer service expected keyword usage recognition score 370 is thereafter used by the simulated caller dialog module 654 to augment the CSR score based on the customer service expected keyword usage recognition score 370.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method, comprising:
   generating a simulated caller dialog for a scenario for testing a customer service representative (CSR), the simulated caller dialog including a caller intended issue specific to the scenario;
   presenting at least a portion of the simulated caller dialog to the CSR, the portion including the caller intended issue;
   receiving a CSR response to the at least the portion of the simulated caller dialog, the CSR response including a CSR interpretation of the caller intended issue in the at least the portion of the simulated caller dialog;
   generating an understanding determination result based on an intent determination recognition score generated by an intent determination recognition model, the understanding determination result indicating whether the CSR in the CSR response correctly or incorrectly identified the caller intended issue, wherein the caller intended issue is known in advance of the receiving the CSR response;
   in response to the intent determination recognition score indicating the CSR incorrectly identified the caller intended issue, generating a CSR response suggestion and displaying the CSR response suggestion to the CSR based on the CSR response, the CSR response suggestion including a behavioral indication to increase empathy in the CSR response to a subsequent restatement of the at least the portion of the simulated caller dialog;
   generating a CSR score for the scenario based on the understanding determination result and an empathy recognition score generated by an empathy recognition model, the empathy recognition model coupled to receive the CSR response, the empathy recognition score generated at least in part based on an application of keyword recognition to words in the CSR response to the simulated caller dialog; and
   recording the CSR score in a database.

2. The computer-implemented method of claim 1, further comprising:
   generating accolade feedback to the CSR in response to the understanding determination result indicating the CSR correctly identified the caller intended issue.

3. The computer-implemented method of claim 1, further comprising:
   restating the at least the portion of the simulated caller dialog in response to the understanding determination result indicating the CSR incorrectly identified the caller intended issue in the CSR response.

4. The computer-implemented method of claim 3, further comprising:
   ceasing restating the at least the portion of the simulated caller dialog in response to the understanding determination result indicating the CSR incorrectly identified the caller intended issue for a failure count threshold quantity of occurrences.

5. The computer-implemented method of claim 1, wherein the generating the understanding determination result using the intent determination recognition model includes:
   comparing words in the CSR response to the caller intended issue with words in the caller intended issue in the at least the portion of the simulated caller dialog; and
   generating the intent determination recognition score in response to an outcome of the comparison.

6. The computer-implemented method of claim 5, further comprising:
   generating a facial emotional recognition score using a facial emotional recognition model, the facial emotional recognition score in response to the facial emotional recognition model determining a level of emotional recognition in the CSR response to the at least the portion of the simulated caller dialog; and
   augmenting the CSR score based on the facial emotional recognition score.

7. The computer-implemented method of claim 5, further comprising:
   generating an empathy keyword usage recognition score using an empathy keyword recognition model, the empathy keyword usage recognition score in response to the empathy keyword recognition model determining a level of empathy keyword usage in the CSR response to the at least the portion of the simulated caller dialog; and
   augmenting the CSR score based on the empathy keyword usage recognition score.

8. The computer-implemented method of claim 5, further comprising:
   generating a customer service expected keyword usage recognition score using an expected customer service keyword recognition model, the customer service expected keyword usage recognition score in response to the expected customer service keyword recognition model determining a level of expected customer service keyword usage in the CSR response to the at least the portion of the simulated caller dialog; and
   augmenting the CSR score based on the customer service expected keyword usage recognition score.

9. The computer-implemented method of claim 1, wherein the generating the CSR score further comprises:
   generating a leaderboard displaying the CSR score of the CSR with respect to previous scores of other CSRs.

10. The computer-implemented method of claim 1, wherein the caller intended issue relates to one of a member, patient, or service provider.

11. A system, comprising:
    one or more processors: and
    a memory storing instructions that, when executed, cause the one or more processors to:
    generate a simulated caller dialog for a scenario for testing a customer service representative (CSR), the simulated caller dialog including a caller intended issue specific to the scenario;

present at least a portion of the simulated caller dialog to the CSR, the portion including the caller intended issue;

receive a CSR response to the at least the portion of the simulated caller dialog, the CSR response including a CSR interpretation of the caller intended issue in the at least the portion of the simulated caller dialog;

generate an understanding determination result based on an intent determination recognition score generated by an intent determination recognition model, the understanding determination result indicating whether the CSR in the CSR response correctly or incorrectly identified the caller intended issue, wherein the caller intended issue is known in advance of the receiving the CSR response;

in response to the intent determination recognition score indicating the CSR incorrectly identified the caller intended issue, generate a CSR response suggestion and displaying the CSR response suggestion to the CSR based on the CSR response, the CSR response suggestion including a behavioral indication to increase empathy in the CSR response to a subsequent restatement of the at least the portion of the simulated caller dialog;

generate a CSR score for the scenario based on the understanding determination result and an empathy recognition score generated by an empathy recognition model, the empathy recognition model coupled to receive the CSR response, the empathy recognition score generated at least in part based on an application of keyword recognition to words in the CSR response to the simulated caller dialog; and record the CSR score in a database.

12. The system of claim 11, wherein the instructions further comprise instructions to:

generate accolade feedback to the CSR in response to the understanding determination result indicating the CSR correctly identified the caller intended issue.

13. The system of claim 11, wherein the instructions further comprise instructions to:

restate the at least the portion of the simulated caller dialog in response to the understanding determination result indicating the CSR incorrectly identified the caller intended issue in the CSR response.

14. The system of claim 13, wherein the instructions further comprise instructions to:

cease restating the at least the portion of the simulated caller dialog in response to the understanding determination result indicating the CSR incorrectly identified the caller intended issue for a failure count threshold quantity of occurrences.

15. The system of claim 11, wherein the instructions to compare further includes instructions to cause to:

compare words in the CSR response to the caller intended issue with words in the caller intended issue in the at least the portion of the simulated caller dialog; and generate the intent determination recognition score in response to an outcome of the comparison.

16. The system of claim 15, wherein the instructions to generate the understanding determination result using the intent determination recognition model includes further includes instructions to cause to:

generate a facial emotional recognition score using a facial emotional recognition model, the facial emotional recognition score in response to the facial emotional recognition model determining a level of emotional recognition in the CSR response to the at least the portion of the simulated caller dialog; and augment the CSR score based on the facial emotional recognition score.

17. The system of claim 15, wherein the instructions further comprise instructions to:

generate an empathy keyword usage recognition score using an empathy keyword recognition model, the empathy keyword usage recognition score in response to the empathy keyword recognition model determining a level of empathy keyword usage in the CSR response to the at least the portion of the simulated caller dialog; and augment the CSR score based on the empathy keyword usage recognition score.

18. The system of claim 15, wherein the instructions further comprise instructions to:

generate a customer service expected keyword usage recognition score using an expected customer service keyword recognition model, the customer service expected keyword usage recognition score in response to the expected customer service keyword recognition model determining a level of expected customer service keyword usage in the CSR response to the at least the portion of the simulated caller dialog; and augment the CSR score based on the customer service expected keyword usage recognition score.

19. The system of claim 11, wherein the instructions to generate the CSR score further includes instructions to:

generate a leaderboard displaying the CSR score of the CSR with respect to previous scores of other CSRs.

20. A system, comprising:

means for generating a simulated caller dialog for a scenario for testing a customer service representative (CSR), the simulated caller dialog including a caller intended issue specific to the scenario;

means for presenting at least a portion of the simulated caller dialog to the CSR, the portion including the caller intended issue;

means for receiving a CSR response to the at least the portion of the simulated caller dialog, the CSR response including a CSR interpretation of the caller intended issue in the at least the portion of the simulated caller dialog;

means for generating an understanding determination result based on an intent determination recognition score generated by an intent determination recognition model, the understanding determination result indicating whether the CSR in the CSR response correctly or incorrectly identified the caller intended issue, wherein the caller intended issue is known in advance of the receiving the CSR response;

in response to the intent determination recognition score indicating the CSR incorrectly identified the caller intended issue, means for generating a CSR response suggestion and displaying the CSR response suggestion to the CSR based on the CSR response, the CSR response suggestion including a behavioral indication to increase empathy in the CSR response to a subsequent restatement of the at least the portion of the simulated caller dialog;

means for generating a CSR score for the scenario based on the understanding determination result and an empathy recognition score generated by an empathy recognition model, the empathy recognition model coupled to receive the CSR response, the empathy recognition score generated at least in part based on an application of keyword recognition to words in the CSR response to the simulated caller dialog; and means for recording the CSR score in a database.

* * * * *